Patented Dec. 4, 1934

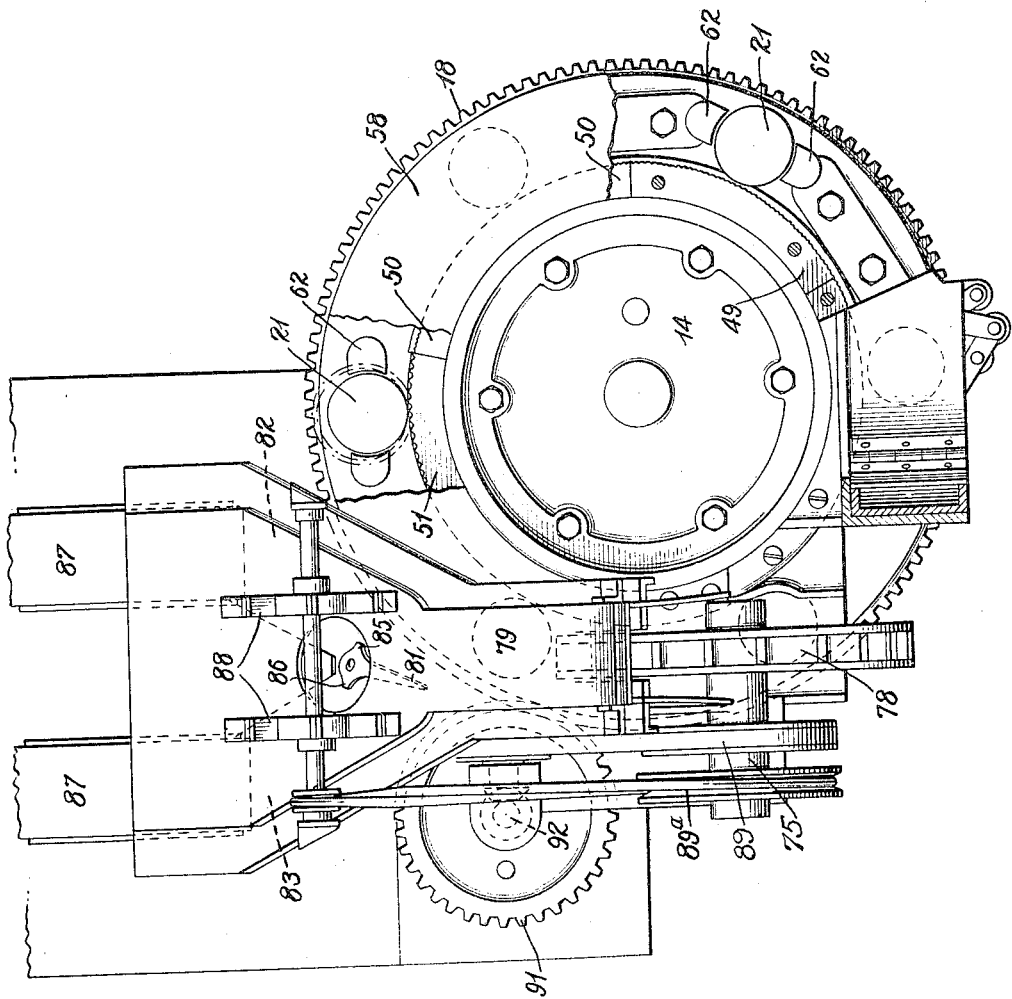

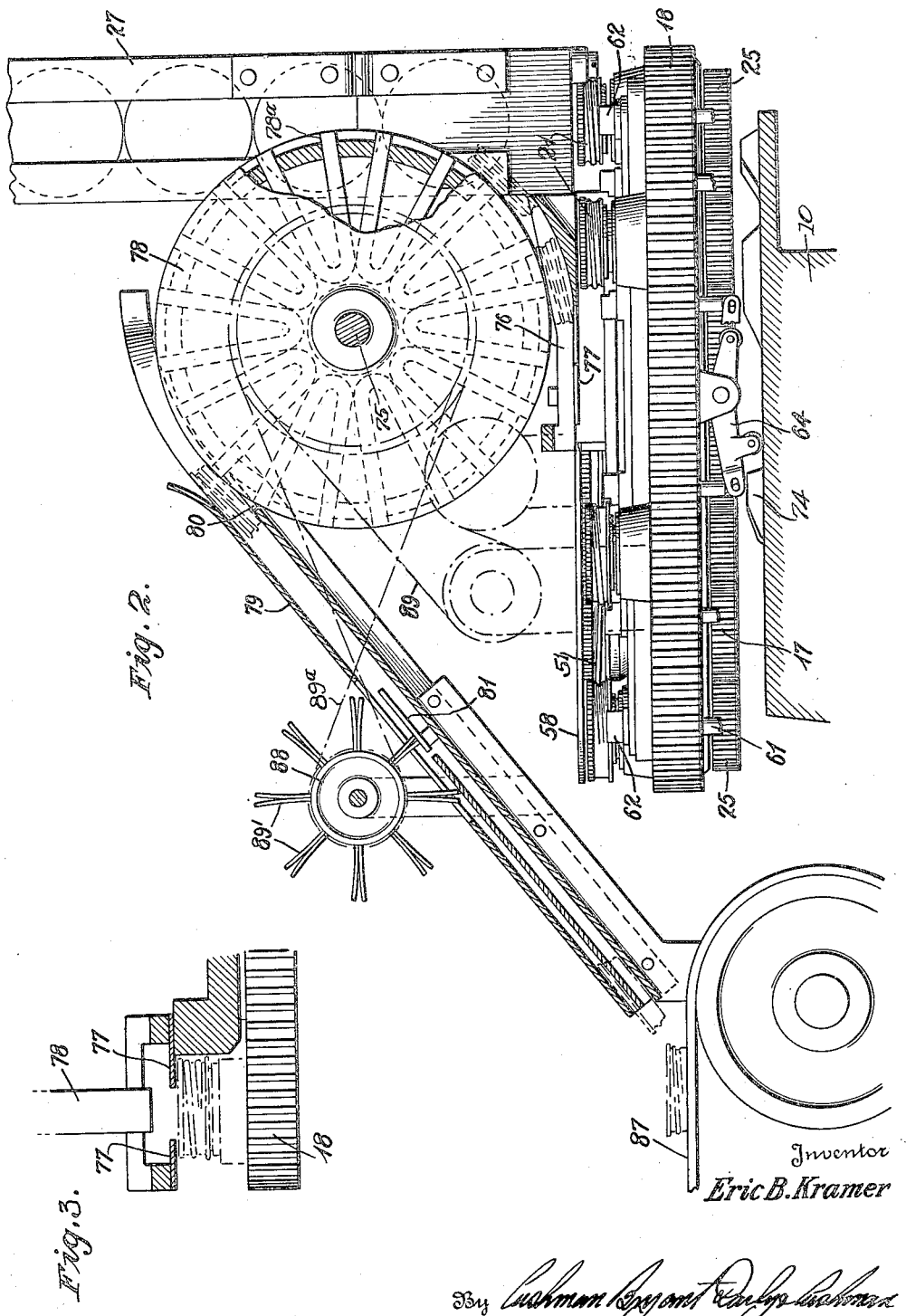

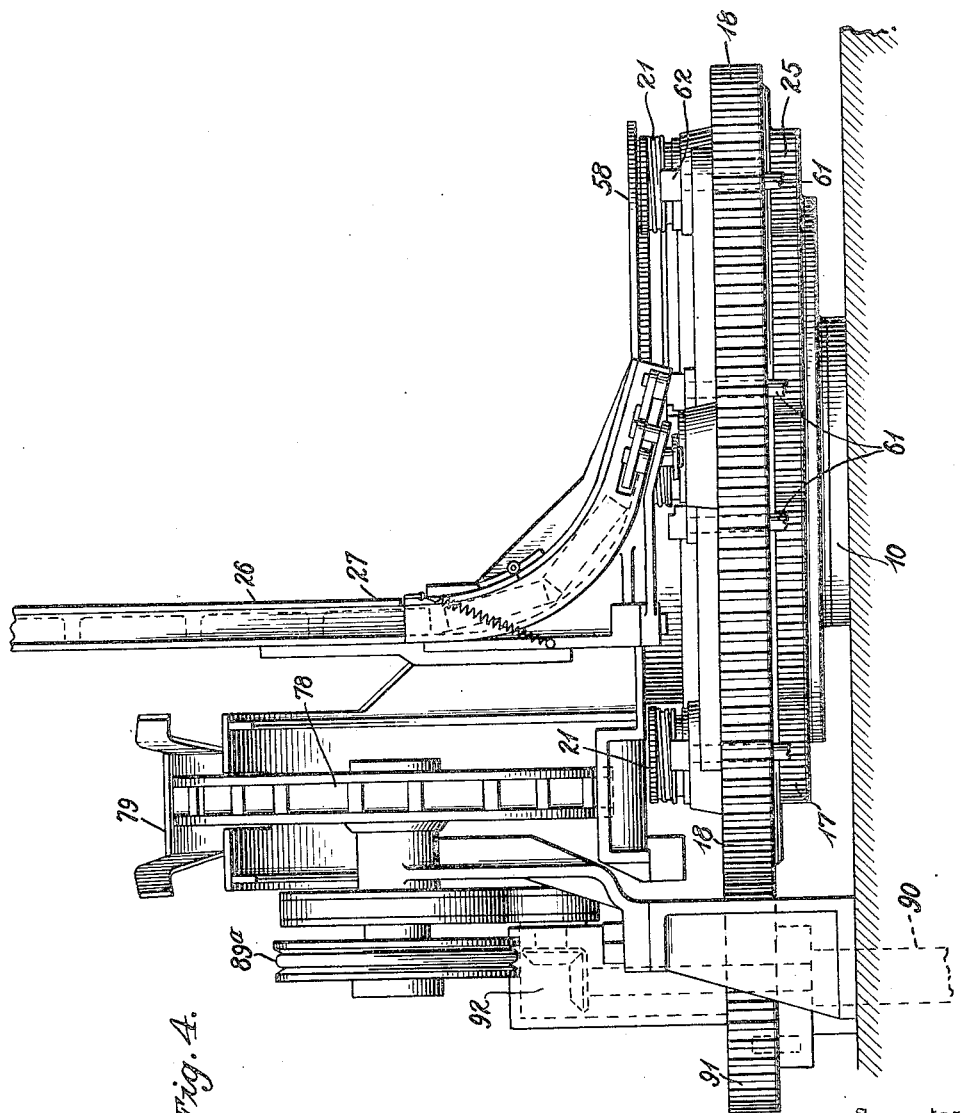

1,983,471

UNITED STATES PATENT OFFICE 1,983,471

CONVEYER MECHANISM

Eric B. Kramer, Baltimore, Md., assignor to Crown Cork & Seal Company, Inc., Baltimore, Md., a corporation of New York Original application July 22, 1931, Serial No. 552,493. Divided and this application August 18, 1932, Serial No. 629,374

2 Claims. (Cl. 198—41)

The present invention relates to a conveyer mechanism. The present application is a division of my application Serial No. 552,493, filed July 22, 1931, Patent 1,900,880, March 7, 1933.

The principal object of the present invention is to provide a conveyer mechanism for use in moving devices in different planes, and in which the means for transferring the devices from one plane to another is of optimum simplicity and efficiency.

Another object of the invention is to provide a conveyer mechanism for handling cup-shaped magnetically responsive devices and by means of which such devices will be inverted during their travel with the conveyer.

Heretofore, it has been necessary to provide carefully synchronized engaging and inverting means to transfer devices from one plane to another and to invert the devices. With the present invention, it is unnecessary to provide separate means to engage each article and no synchronization is necessary.

The conveyer mechanism of the present invention comprises a conveyer rotatable on a vertical axis and arranged to individually support cup-shaped magnetically responsive devices in spaced relation with their closed ends uppermost, this conveyer moving the devices in a horizontal plane to a second conveyer which is adapted to remove the devices from the first conveyer and move the same in a vertical plane. The second conveyer includes magnetic means adapted to cause the devices to adhere thereto with their closed ends in surface to surface contact with the conveyer during movement about the latter through an arc of at least 180° whereby to invert the devices. A chute or the like is associated with the second conveyer to strip the devices from the latter while in inverted position and deliver them to any suitable point, such as to a machine for performing a further operation upon the devices.

Referring to the drawings:

Figure 1 is a top plan view showing my conveyer mechanism included in a cap forming machine, Figure 2 is a side elevational view, Figure 3 is a sectional view of means included in the conveyer mechanism for presenting devices to the magnetic means of the conveyer, and Figure 4 is a further elevational view of the mechanism.

The conveyer mechanism of the present invention is disclosed applied to a machine for forming cap blanks such as is described and claimed in my Patent No. 1,900,880, issued March 7, 1933, but its application to other uses will be obvious.

In order to make the operation of the conveyer mechanism apparent, the construction and operation of the cap forming machine may be broadly described as follows:

The cap forming machine is mounted upon a support or base 10 upon which a conveyer wheel 18 is journalled to rotate in a horizontal plane. The wheel 18 is provided with gear teeth about its periphery with which a driving pinion 91 is adapted to mesh. The pinion 91 is carried by a driving shaft 90 driven from any suitable source of power, thereby causing the conveyer 18 to rotate upon the supporting frame 10.

A plurality of vertically disposed mandrels 21 are circumferentially spaced about the conveyer wheel 18, the mandrels being mounted for rotation in the wheel. A stationary sun gear 17 is fixed to the supporting frame 10 and pinions 25 fixed to the lower ends of the mandrels 21 mesh with the sun gear 17 with the result that rotation of the conveyer wheel 18 with respect to the supporting frame 10 will cause the mandrels 21 to move about the sun gear and to bodily rotate during such movement.

As best shown in Figure 1, a ring or plate 14 is fixed to the supporting element 10 within the wheel 18 and a first knurling and wiring die 49, a second knurling and wiring die 50 and a threading die 51 are fixed to the periphery of the plate 14 and beneath a stationary hold-down plate 58.

Moving chucks or die heads carried at the upper ends of the mandrels 21 are positioned in the plane of the fixed die elements 49, 50 and 51 and, upon bodily movement and rotation of the mandrels 21, cooperate with the fixed die elements to form cap blanks to the desired configuration, all as described in my above-mentioned patent.

In the operation of the structure described above, flanged cup-shaped cap blanks, formed of magnetically responsive material, are supplied to the die heads of the mandrels from a feeding chute or other suitable means of supply 26, the blanks being positioned upon the chucks by a cap feeding mechanism of the type disclosed in my patent referred to above. The conveyer wheel 18 rotates (fig. 1) in a counter-clockwise direction and the movement of a mandrel past the knurling and wiring and threading dies will cause the blank which has been positioned upon that mandrel to be formed into a substantially cup-shaped cap or device.

After moving past the threading die 51, the mandrel carrying the cup-shaped device will move beneath a slideway 76 and, at this moment, the cup-shaped device will be elevated by blocks 62 at the upper ends of plungers 61, the plungers being operated by levers 64 having rollers thereon which engage cam surfaces 74 on the base 10, thereby lifting the blocks to raise the cup-shaped device so that the latter will be positioned upon shoulders 77 (Fig. 3) in the slideway. A conveyer wheel 78 is disposed above the slideway, this conveyer wheel being rotatable on a horizontal shaft 75 by means of a belt 89, the belt being driven by a pulley which is in turn driven from the driven shaft 90 by means of suitable gearing generally indicated by the numeral 92.

The conveyer wheel 78 is provided with permanent magnets 78a so arranged therein that the periphery of the wheel is magnetized. By this arrangement, a cap or cup-shaped device presented in the slideway 76 will be immediately moved from the latter, by the action of the magnets, the closed or top end of the cup-shaped device being uppermost and in surface to surface contact with the conveyer wheel. The cup-shaped devices will be held upon the conveyer wheel during movement thereabout for at least 180° so that the cup-shaped device will be inverted. A chute 79 is fixed adjacent the conveyer wheel in such position that the cap device will be stripped and removed from the conveyer wheel by the edge 80 of the chute as shown in Figure 2, the cup-shaped device then moving downwardly through the chute.

The caps or other cup-shaped devices received in the inclined chute 79 pass downwardly by gravity, and a selector finger 81 is disposed in the chute to pass the devices to separate channels 82 and 83. This selector finger 81 is freely pivoted and has projections 85 and 86 on each side thereof which are engaged by the devices to alternately move the finger from one side to another, so as to direct alternate devices into diverging passages 82 and 83 included in chute 79. A conveyer 87, preferably an endless conveyer, is provided beneath the lower end of each chute 82 and 83 to convey the devices to any desired point. If the cup-shaped devices are caps, they will be moved to a liner inserting machine, and, since the devices have their open ends uppermost, liners may be readily inserted therein.

Associated with the magnetic conveyer wheel 78 are a pair of rotating picker members 88 as shown in Figures 1 and 2, which by reason of driving connection through a belt 89a with the wheel 78 are caused to rotate. These picker members 88 are provided with a plurality of laterally extending flexible fingers 89', which extend through openings into the respective passages 82 and 83. The constantly rotating fingers will engage any devices in the chutes to prevent clogging of the latter.

I claim:—

1. A conveyer mechanism comprising, in combination, a conveyer rotatable on a vertical axis and arranged to individually support cup-shaped magnetically responsive devices in spaced relation with their closed ends uppermost and to move the devices in a horizontal plane, a second conveyer adapted to remove the devices from said first named conveyer and move the same in a vertical plane, magnetic means included in said second conveyer adapted to cause the devices to adhere thereto with their closed ends in surface to surface contact with said second conveyer during movement about the latter through an arc of at least 180° whereby to invert the devices, and means associated with said second conveyer to strip and remove the devices therefrom in said inverted position.

2. A conveyer mechanism comprising, in combination, a conveyer wheel rotatable on a vertical axis and arranged to individually support cup-shaped magnetically responsive devices in spaced relation with their closed ends uppermost and to move the devices in a circular path, a second conveyer wheel rotatable on a horizontal axis and having a magnetized periphery to which the closed ends of the devices adhere to remove the same from said first named rotary wheel and to turn the devices through an arc of at least 180° whereby to invert the same, and means associated with said last named wheel to strip and remove the devices therefrom in inverted position.

ERIC B. KRAMER.